United States Patent Office 3,337,550
Patented Aug. 22, 1967

3,337,550
PROCESS FOR PREPARING TRIAZINES AND IMIDAZOLES
John Yates, Whitstable, and Ernest Haddock, Sheerness, England, assignors to Shell Oil Company, New York, N.Y., a corporation of Delaware
No Drawing. Filed June 1, 1964, Ser. No. 371,825
Claims priority, application Great Britain, Dec. 10, 1963, 48,704/63
6 Claims. (Cl. 260—249.5)

This invention relates to the preparation of 1,3-diaza heterocyclic compounds containing in the ring at least one group

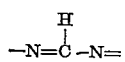

and having a total of 5 or 6 ring atoms. More particularly the invention relates to a process for preparing 1,3,5-triazines and 1,3-diazoles (imidazoles). This invention also relates to novel 1,3,5-triazines which are prepared according to the process of this invention.

Imidazoles and 1,3,5-triazines have a variety of uses such as in fungicides, herbicides, insecticides, dyestuffs, rust inhibitors, vulcanization accelerators, etc. However, methods previously used to prepare these useful compounds have involved the use of starting materials which are not readily available or involve methods which resulted in low yields and/or in which a number of by-products are formed.

It is an object of this invention to provide an improved process for preparing cyclo di- to tri aza alka-di- to trienes of 5 to 6 ring atoms with each pair of ring N-atoms being separated by at least one ring C-atom such as 1,3,5-triazines and imidazoles. It is also an object of this invention to prepare novel derivatives of 1,3,5-triazine.

According to this invention 1,3,5-triazines and imidazoles are prepared by reacting a compound selected from the group consisting of a C-halo 1,3,5-triazine and a 2-haloimidazole with triphenylphosphine and contacting the resulting phosphonium salt with a base in a liquid reaction medium.

The preferred starting materials used in the process may be represented by the formulas:

(I)

and (II)

where X is a halogen, preferably chlorine or bromine and A and B each represent hydrogen, halogen, hydrocarbyl, hydrocarbyloxy, hydrocarbylthio, or —NR$_1$R$_2$ wherein R$_1$ and R$_2$ are hydrogen, hydrocarbyl, hydrocarbyloxy, hydrocarbylthio, or acyl groups. The said hydrocarbyl, hydrocarbyloxy or hydrocarbylthio groups may be alkyl, alkenyl, alkadienyl, alkynyl, cycloalkyl, cyclo-alkenyl, cyclo-alkadienyl, aryl, aralkyl, aralkenyl, and alkaryl.

In the preparation of the 1,3,5-triazines and imidazoles according to the invention the triphenylphosphine reacts with a halogen atom bound to the ring carbon atom between the nitrogen atoms of the group

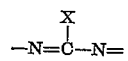

Thus for example if in compounds of the type represented by Formula II where A and B are halogens, triphenylphosphine reacts only with the halogen designated by X.

A and B of the starting materials shown in the Formulas I and II are each preferably selected from hydrogen, halogen, R, ZR and NR$_1$R$_2$ where Z is oxygen or sulfur (a chalcogen atom of atomic number from 8 to 16), R is an aliphatic or aromatic having from one to about 10 carbon atoms, and R$_1$ and R$_2$ may each be hydrogen, an aliphatic or aromatic having from one to about 10 carbon atoms or an acyl. Suitable acyl groups are aliphatic or aromatic carboxylic acid derived and preferably contain from one to 10 carbon atoms. The aliphatic and aromatic groups represented by R, R$_1$ and R$_2$ as well as the aliphatic and aromatic acyl groups may be substituted with one or more substituents which do not react or otherwise interfere with the process under the reaction conditions. Examples of suitable substituents are halogen, hydroxy, alkoxy, nitro, cyano, amino, alkylamino and arylamino radicals. Suitable acyl groups are for example acetyl, propionyl, butyryl, isobutyryl, caproyl, benzoyl, chlorobenzoyl, cinnamyl, phenylacetyl, carbamoyl, phenylcarbamoyl and chlorophenyl-carbamoyl.

The process of the invention involves two reactions which may be accomplished in one or two separate steps as will be explained below. During the process two reactions occur. In the first reaction between the halogen-substituted 1,3-diaza-compound and triphenylphosphine a phosphonium salt is formed. In the second reaction the phosphonium salt is treated with a base in a liquid reaction medium wherein the P$_1$(C$_6$H$_5$)$_3$·X moiety of the phosphonium salt is replaced by hydrogen. This may be exemplified by the preparation of 2,4-bisethylamino-1,3,5-triazine.

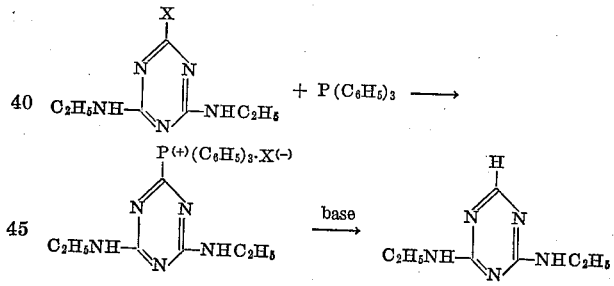

The first reaction is preferably carried out in a polar essentially neutral organic solvent. Suitable solvents are, for example, oxa- and/or oxa-hydrocarbons, alcohols especially alkanols, such as methanol, ethanol or isopropanol, ketones, especially alkanones, such as acetone or methyl ethylketone, ethers especially oxaalkanes, such as diethylether, tetrahydrofuran, and 1,2-dimethoxyethane, and esters, especially alkyl alkanoates, such as ethyl acetate. Methanol is preferred. The reaction may be carried out at a temperature between about 0° and about 200° C., preferably between about 50° and about 150° C. Preferably stoichiometric quantities of the C-halo 1,3-diazacompound and triphenylphosphine are used. Very good results are obtained by refluxing the C-halo 1,3-diazacompound in methanol with the stoichiometric amount of triphenylphosphine.

The second reaction is carried out by contacting the phosphonium salt formed in the first reaction with a base in a liquid reaction medium. The second reaction is generally carried out in a separate step, but, as will be set out below, in some cases it is also possible that the second reaction takes place simultaneously with the first reaction so that no separate step for the second reaction is necessary.

Preferably the phosphonium salt formed by reacting the chloroaza-compound with triphenylphosphine is separated from the reaction mixture before being treated with the base. This separation may be carried out in any conventional manner. For example, the solvent used in the first reaction may be evaporated off, and the residue obtained may be purified by refluxing with ethyl acetate, the remaining solid which is filtered off being the desired phosphonium salt. It should be understood, however that separation of the phosphonium salt may be omitted, and that the second reaction may be carried out with the crude reaction mixture obtained by reacting the chlorotriazine with triphenylphosphine.

To obtain the 1,3,5-triazine or imidazole, the triphenylphosphonium salt of the C-halotriazine or halodiazole is treated with a base in a liquid reaction medium. If the reaction mixture obtained in the first reaction already contains a suitable solvent this reaction mixture may be used as such for the second reaction without isolation of the phosphonium salt. Thus it may be only necessary to add a base directly to the triphenylphosphonium salt reaction mixture. If the phosphonium salt is separated from the reaction product mixture the salt is mixed with a base and in liquid reaction medium. Suitable bases are, for example, hydroxides, alkoxides, carbonates, bicarbonates, cyanides or carboxylates of alkali or alkaline earth metals $C_2H_5OK$, $NaCN$, $KCN$, $K_2CO_3$, $NaHCO_3$, and $$CH_3SOONa$$

Ammonia and amines may also be used. Suitable liquid reaction media are neutral hydroxylic compounds such as water and mono- and polyhydric alcohols for example methanol, ethanol, propanol, butanols, pentanols, hexanols, octanols, ethylene glycol, and propylene glycol, ethers such as diethyl ether, tetra-hydrofuran, and 1,2-dimethoxyethane, ether-alcohols such as 2-methoxyethanol, 2-ethoxyethanol, and diethylene glycol, ketones, such as acetone and methyl ethyl ketone, and aromatic hydrocarbons such as benzene, toluene and xylene. Very good results are obtained by treating the phosphonium salt with KOH or NaOH, in water and/or an alcohol containing 1–4 carbon atoms, or with a sodium or potassium alkoxide containing 1–4 carbon atoms in an alkanol containing 1–4 carbon atoms such as sodium methoxide in methanol. Most preferably the phosphonium salt is contacted with a solution of KOH or NaOH in water and/or methanol or ethanol. The base is preferably used in at least the stoichiometric quantity. Larger or smaller amounts may also be used, however, since the amount used is not critical. The treatment of the phosphonium salt with a base in a liquid reaction medium is generally carried out at a temperature between about 0° and about 150° C., room temperature being quite suitable.

The 1,3,5-triazine or imidazole obtained by conversion of the phosphonium salt may be separated from the reaction mixture in any conventional manner. If, for example, an aqueous solution of the phosphonium salt was treated with an aqueous solution of NaOH or KOH, the desired product, often contaminated with triphenylphosphine oxide, precipitates from the reaction mixture. This crude product may be purified by recrystallization from a suitable solvent, such as benzene, petroleum ether or ethyl acetate, or by distillation under reduced pressure. In many cases a pure product may be obtained by refluxing the crude product with benzene in order to extract the contaminating triphenylphosphine oxide.

When preparing the imidazoles from the 2-haloimidazole, the second reaction (i.e.: reaction of the phosphonium salt) may take place in the same step with the first reaction, if this latter reaction is carried out in a liquid reaction medium. For example when 2,4,5-tribromoimidazole is refluxed with triphenylphosphine in ethanol, the phosphonium salt breaks down immediately after it is formed yielding the HBr-salt of 4,5-dibromoimidazole according to:

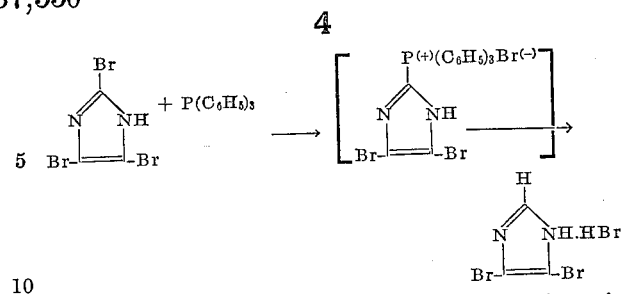

The HBr-salt which crystallizes from the reaction mixture may, of course, be converted into the 4,5-dibromoimidazole by treating it with a base in a conventional manner. In the case of tribromoimidazole, the triphenylphosphine itself is apparently sufficiently basic to neutralize the phosphonium salt. Unlike the preparation of the 1,3,5-triazines no separate step for the neutralization of the phosphonium salt is necessary. By carrying out the reaction between the 2,4,5-tribromoimidazole and the triphenylphosphine in a liquid reaction medium, the requirement that the phosphonium salt should be contacted with a base in a liquid reaction medium, is already fulfilled, the triphenylphosphine itself acting as base in this particular case.

The novel 1,3,5-triazine compounds which are prepared by the process of the invention may be represented by the formulas:

(III) 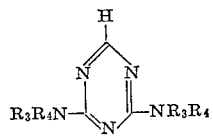

(IV) 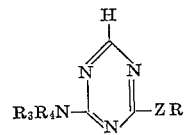

and (V) 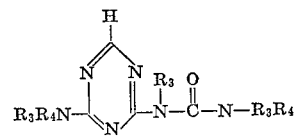

where $R_3$ is hydrogen or a hydrocarbyl of from 2 to 10 carbon atoms; $R_4$ is a hydrocarbyl of from 2 to 10 carbon atoms; R is a hydrocarbyl of from 1 to 10 carbon atoms; Z=oxygen or sulfur.

The hydrocarbyl groups are unsubstituted or may be substituted with a halogen, such as a middle halogen chlorine or bromine. The novel 1,3,5-triazines are valuable herbicides and also may be used as intermediates in the preparation of insecticides and bactericides. Some specific examples of the novel compounds as above described are set forth in Examples I–IX below.

EXAMPLE I.—*Preparation of 2,4-bis(ethylamino)-1,3,5-triazine*

A mixture of 60 grams of 2-chloro-4,6-bis(ethylamino)-1,3,5-triazine, 78.6 grams of triphenylphosphine, and 750 ml. of methanol was refluxed for 3 hours. The solution was filtered, and the solvent distilled off. The residue was refluxed twice with 500 ml. of ethyl acetate and the remaining solid filetered off. After drying in the air 72 grams of white powdery 2,4-bis(ethylamino)-1,3,5-triazin-6-yl-triphenylphosphonium chloride, melting point 210°C., was obtained; yield 50%.

*Analysis.*—Calculated for $C_{25}H_{27}ClN_5P$: C, 64.8%; H, 5.8%; N, 15.1%; Cl, 7.7%; P, 6.7%. Found: C, 64.8; H, 6.2; N, 15.0, Cl, 7.8; P, 6.9%.

9.9 grams of the above phosphonium salt was dissolved in 500 ml. of water, and 200 ml. of 0.1 N-sodium hydroxide solution was added with stirring. A white precipitate was formed which was filtered off and dried in the air, yielding 6.4 grams of a crude product having a melting point of 140° C. This was treated with benzene in order to remove contaminating triphenylphosphine oxide leaving 2.5 grams of 2,4-bis-(ethylamino)-1,3,5-triazine, melting point 201° C; yield 70%. Recrystallization from benzene gave colorless crystals having the same melting point.

*Analysis.*—Calculated for $C_7H_{13}N_5$: C, 50.4%; H, 7.8%; N, 42.0%. Found: C, 49.8%; H, 8.1%; N, 41.5%.

EXAMPLE II.—*Preparation of 2,4-bis(isopropylamino)-1,3,5-triazine*

A mixture of 22.9 grams of 2-chloro-4,6-bis(isopropylamino)-1,3,5-triazine, 26.2 grams of triphenylphosphine, and 500 ml. of methanol was refluxed for 3 hours. The solution was filtered and the solvent evaporated. The residue was refluxed with 400 ml. of ethyl acetate resulting in a white powder which was filtered off, washed with ethyl acetate and dried. 48 grams of 2,4-bis(isopropylamino)-1,3,5-triazin-6-yl-triphenylphosphonium chloride, melting point 208°C., was obtained. Yield 98%.

*Analysis.*—Calculated for $C_{27}H_{31}ClN_5P$: C, 65.9%; H, 6.3%; N, 14.3%; Cl, 6.9%. Found C, 65.2%; H, 6.6%; N, 13.7%; Cl, 6.9%.

The phosphonium salt (9.8 grams) was dissolved in 500 ml. of water, and a solution of 1.5 gram of potassium hydroxide in 50 ml. of water was added with stirring. A white solid precipitated which was filtered off and dried in the air. The crude product (7.4 grams, melting point 148–170° C.) was treated with warm benzene to remove contaminating triphenylphosphine oxide leaving a white residue of 2,4-bis(isopropylamino)-1,3,5-triazine, melting point 220° C.; yield 80%. After recrystallization from benzene colorless platelets having a melting point of 221° C. were obtained.

*Analysis.*—Calculated for $C_9H_{17}N_5$: C, 55.4%; H, 8.7%; N, 35.9%. Found: C, 55.1%; H, 8.9%; N, 36.2%.

EXAMPLE III.—*Preparation of 2-diethylamino-4-ethylamino-1,3,5-triazine*

A mixture of 5.6 grams of 2-chloro-4-ethylamino-6-diethylamino-1,3,5-triazine, 5.2 grams of triphenylphosphine, and 60 ml. of methanol was refluxed for 20 hours. The methanol was distilled off and the residue refluxed with 100 ml. of ethyl acetate, yielding 9 grams of white crystals of 2-ethyl-amino-4-diethylamino-1,3,5-triazin-6-yl-triphenylphosphonium chloride; melting point 209–210° C.; yield 83%.

*Analysis.*—Calculated for $C_{27}H_{31}ClN_5P$: C, 65.9%; H, 6.3%; N, 14.2%; Cl, 7.2%; P, 6.3%. Found: C, 65.6%; H, 6.6%; N, 14.1%; Cl, 6.9%; P, 7.0%.

15 grams of the above phosphonium salt was dissolved in 500 ml. of water, and 200 ml. aqueous 0.1 N-sodium hydroxide solution was added with stirring. A white precipitate was formed which was filtered off and dissolved in ether. Dry HCl-gas was passed through the solution giving a white precipitate which was filtered off, and dissolved in water. After addition of a dilute aqueous solution of $NaHCO_3$ a white solid precipitated which was filtered off and recrystallized from petroleum ether (boiling point 40–60° C.). The yield was 1 gram of 2-diethylamino-4-ethylamino-1,3,5-triazine, having a melting point of 63–65° C.

*Analysis.*—Calculated for $C_9H_{17}N_5$: C, 55.4%; H, 8.7%; N, 35.9%. Found: C, 56.3%; H, 8.8%; N, 36.1%.

EXAMPLE IV.—*Preparation of 2-ethylamino-4-isopropylamino-1,3,5-triazine*

2 - ethylamino-4-isopropylamino - 1,3,5-triazin-6-yl-triphenyl-phosphonium chloride was prepared by refluxing 11 grams of 2-chloro-4-ethylamino - 6 - isopropylamino-1,3,5-triazine with 13 grams of triphenylphosphine in 100 ml. of methanol for 20 hours. The product was isolated by the same method as described in Example III. Yield 18 grams (75%); melting point 236–238° C.

*Analysis.*—Calculated for $C_{26}H_{29}ClN_5P$: C, 65.3%; H, 6.1%; N, 14.7%; Cl, 7.4%; P, 6.5%. Found: C, 65.5%; H, 6.1%; N, 14.9%; Cl, 7.6%; P, 6.5%.

10 grams of the above phosphonium salt was dissolved in 100 ml. of water, and a solution of 1.5 grams of potassium hydroxide in 50 ml. of water was added with stirring. The white precipitate was filtered off, dried, washed with benzene, and dried again. 2.5 grams (64%) of 2-ethylamino-4-isopropylamino-1,3,5-triazine was obtained having a melting point of 181–183° C.

*Analysis.*—Calculated for $C_8H_{15}N_5$: C, 53.0%; H, 8.3%; N, 38.7%. Found C, 53.3%; H, 8.2%; N, 38.6%.

EXAMPLE V.—*Preparation of 2,4-bis(diethylamino)-1,3,5-triazine*

2,4 - bis(diethylamino) - 1,3,5 - triazin - 6 - yl - triphenylphosphonium chloride was prepared from 2-chloro-4,6 - bis(diethylamino) - 1,3,5 - triazine and triphenylphosphine by the same method as described in Example III. Then melting point of the product was 127–130° C.

*Analysis.*—Calculated for $C_{29}H_{34}ClN_5P$: C, 67.0%; H, 6.7%; N, 13.5%; Cl, 6.8%; P, 6.0%. Found: C, 66.1%; H, 7.0%; N, 12.8%; Cl, 6.7%; P, 5.8%.

10 grams of the above phosphonium salt was dissolved in 100 ml. of water, to which solution was added an aqueous solution of NaOH. The mixture was extracted with ether and the extract dried over $MgSO_4$. The residue obtained by distilling off the ether was treated with petroleum ether (boiling point 40–60° C.). The petroleum ether was distilled off, and the residue distilled under reduced pressure, yielding 2.5 grams (58%) of 2,4-bis(diethylamino)-1,3,5-triazine having a boiling point of 126° C. at 2.8 mm. Hg pressure.

*Analysis.*—Calculated for $C_{11}H_{21}N_5$: C, 59.2%; H, 9.4%; N, 31.4%. Found: C, 59.6%; H, 9.5%; N, 31.5%.

EXAMPLE VI.—*Preparation of 2-amino-4-(p-chloroanilino)-1,3,5-triazine*

2 - amino - 4 - (p - chloroanilino) - 1,3,5 - triazin - 6-yl-triphenyl-phosphonium chloride was prepared by refluxing 12 grams of 2 - amino - 4 - chloro - 6 - p - chloroaniline - 1,3,5 - triazine with 12 grams of triphenyl phosphine in 200 ml. of methanol for 20 hours. The product, a pale yellow solid, was separated by the same method as described in Example III. 17 grams (71%) was obtained; melting point 282–285° C.

*Analysis.*—Calculated for $C_{27}H_{22}Cl_2N_5P$: C, 62.5%; H, 4.3%; N, 13.5%; Cl, 13.7%. Found: C, 61.5%; H, 4.4%; N, 13.2%; Cl, 13.1%.

7 grams of the above phosphonium salt was dissolved in 20 ml. of methanol to which solution 20 ml. of water was added. The solution was then treated with an aqueous NaOH solution, and the precipitate filtered off. The solid was washed with benzene and petroleum ether (boiling point 40–60° C.), and crystallized from ethyl acetate. The yield was 2 grams (66°) of 2 - amino - 4 - (p - chloroanilino)-1,3,5-triazine; melting point 262–263° C.

*Analysis.*—Calculated for $C_9H_8ClN_5$: C, 48.8%; H, 3.6%; N, 31.6%; Cl, 16.0%. Found: C, 48.7%; H, 3.6%; N, 31.5%; Cl, 16.4.

EXAMPLE VII.—*Preparation of 2-(N-3-chlorophenylcarbamoyl - N - ethylamino)-4 - diethylamino - 1,3,5-triazine*

A mixture of 6.3 grams of 2 - chloro - 4 - (N - 3-chlorophenylcarbamoyl - N - ethylamino) - 6 - diethylamino - 1,3,5 - triazine, 4.4 grams of triphenylphosphine, and 100 ml. of methanol was refluxed for 20 hours. The methanol was distilled off, and the residue crystallized from acetone, yielding 3.5 grams 2 - (N - 3 - chlorophenylcarbamoyl - N - ethylamino) - 4 - diethylamino - 1,3,5-triazin - 6 - yl - triphenylphosphonium chloride; melting point 169–171° C.

*Analysis.*—Calculated for $C_{34}H_{35}OCl_2N_6P$: C, 63.3%; H, 5.4%; N, 13.0%; Cl, 11.0%; P, 4.8%. Found: C, 63.5%; H, 5.5%; N, 13.0%; Cl, 10.8%; P, 5.2%.

2 grams of the above phosphonium salt was dissolved in 30 ml. of hot water, and the solution neutralized with an aqueous solution of $NaHCO_3$. The mixtures was extracted with ether, and the extract washed with diluted aqueous HCl. By neutralization of the aqueous solution with $NaHCO_3$, a white solid was obtained which was taken up in ether. The ether was distilled off and the residue crystallized from petroleum ether (boiling point 60–80° C.). Yield of 2 - (N - 3 - chlorophenylcarbamoyl-N - ethylamino) - 4 - diethylamino - 1,3,5 - triazine, 0.5 grams, (45%) was obtained; melting point 104–106° C.

*Analysis.*—Calculated for $C_{16}H_{21}OClN_6$: C, 55.1%; H, 6.0%; N, 24.1%; Cl, 10.2%. Found: C, 54.8%; H, 6.3%; N, 23.9%; Cl, 10.2%.

EXAMPLE VIII.—Preparation of 2-diethylamino-4-methoxy-1,3,5-triazine

2 - diethylamino - 4 - methoxy - 1,3,5 - triazin - 6 - yl-triphenylphosphonium chloride was prepared by refluxing 8.1 grams of 2 - chloro - 4 - diethylamino - 6 - methoxy-1,3,5 - triazine with 10 grams triphenylphosphine in 100 ml. of methanol for 20 hours. The product was isolated by the same method as described in Example III, yielding 16 grams (89%); melting point 148°–150° C.

*Analysis.*—Calculated for $C_{26}H_{28}OClN_4P$: C, 65.2%; H, 5.9%; N, 11.7%; Cl, 7.4%; P, 6.5%. Found: 64.6%; H, 6.0%; N, 11.8%; Cl, 7.8%; P, 6.0%.

10 grams of the above phosphonium salt was dissolved in 100 ml. of water, and the solution neutralized with an aqueous solution of NaOH. The white precipitate was taken up in ether, and the extract evaporated to dryness. The residue was extracted with petroleum ether (boiling point 40–60° C.), and the extract evaporated to dryness. The residual oil was distilled under reduced pressure. The yield was 1 gram of 2 - diethylamino - 4 - methoxy - 1,3,5-triazine; boiling point 108–110° C. at 3 mm. Hg pressure.

*Analysis.*— Calculated for $C_8H_{14}ON_4$: C, 52.7%; H, 7.7%; N, 31.0%. Found: C, 52.6%; H, 7.4%; N, 30.9%.

EXAMPLE IX.—Preparation of 2-benzylthio-4-diethylamino-1,3,5-triazine

2 - benzylthio - 4 - diethylamino - 1,3,5 - triazin - 6-yl - triphenylphosphonium chloride was prepared from 2-chloro - 4 - benzylthio - 6 - diethylamino - 1,3,5 - triazine by the same method as employed in Example III. The phosphonium salt was converted to 2 - benzylthio - 4 - diethylamino - 1,3,5 - triazine by applying the method described in the previous example. The product was an oil having a boiling point of 186–188° C. at 1.5 mm. Hg pressure.

*Analysis.*—Calculated for $C_{14}H_{18}SN_4$: N, 20.4%; S, 11.7%. Found: N, 19.8%; S, 11.5%.

EXAMPLE X.—Preparation of 4,5-dibromoimidazole

A mixture of 15 grams of 2,4,5-tribromoimidazole and 13 grams of triphenylphosphine was refluxed in 100 ml. of ethanol for 30 minutes. White crystals (melting point 274°–276° C.) of 4,5-tribromoimidazole hydrobromide which seperated from the reaction mixture, were filtered off and dissolved in water. The solution was neutralized with an aqueous solution of $NaHCO_3$, and the product which was a white solid was filtered off. The yield was 7 grams (63%); melting point 223–225° C.

*Analysis.*—Calculated for $C_3H_2Br_2N_2$: C, 15.9%; H, 0.9%; Br, 70.8%; N, 12.4%. Found: C, 15.7%; H, 1.1%; Br, 70.7%; N, 12.6%.

*Analysis of the HBr-salt.*—Calculated for $C_3H_3Br_3N_2$: C, 11.7%; H, 1.0%; Br, 78.1%; N, 9.1%. Found: C, 12.1%; H, 1.4%; Br, 78.4%; N, 9.0%.

We claim as our invention:

1. A compound selected from the group consisting of

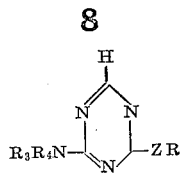

and

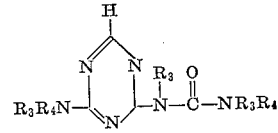

wherein Z is sulfur, $R_3$ is selected from the group consisting of hydrogen and hydrocarbyl having from 2 to 10 carbon atoms, $R_4$ is hydrocarbyl having from 2 to 10 carbon atoms and R is hydrocarbyl having from 1 to 10 carbon atoms.

2. 2 - (N-3-chlorophenylcarbamoyl-N-ethylamino)-4-diethylamino-1,3,5-triazine.

3. 2-benzylthio-4-diethylamino-1,3,5-triazine.

4. A process for preparing a 1,3-diaza-heterocyclic compound in the ring at least one group

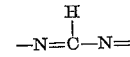

and having a total of 5 to 6 ring atoms comprising reacting a corresponding halogen substituted 1,3-diaza-heterocyclic compound having in the ring at least one group.

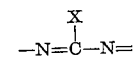

where X is a halogen, with triphenyl phosphine and contacting the resulting phosphonium salt product with a base in a liquid reaction medium.

5. A process for preparing a 1,3,5-triazine and imidazoles comprising reacting a halogen substituted 1,3-diaza-heterocyclic compound selected from the group consisting of a 1,3,5-triazine having the formula

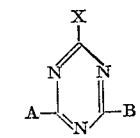

and an imidazole having the formula

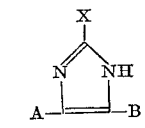

wherein X is a halogen and each A and B are each selected from the group consisting of hydrogen, halogen, R, ZR and $NR_1R_2$ wherein R is a hydrocarbyl having from one to ten carbon atoms, Z is selected from the group consisting of oxygen and sulfur, $R_1$ and $R_2$ are selected from the group consisting of hydrogen, hydrocarbyl and carboxylic acyl said hydrocarbyl and acyl having from one to 10 carbon atoms, with triphenyl phosphine in a polar organic solvent at a temperature between about 0° and about 200° C. and contacting the resulting phosphonium halide salt product with a base in a liquid reaction medium at a temperature of from about 0° and 150° C.

6. The process of claim 5 wherein the base is an alkali metal hydroxide and said liquid reaction medium is a neutral hydroxylic compound containing no more than 4 carbon atoms.

(References on following page)

References Cited

UNITED STATES PATENTS

| | | | |
|---|---|---|---|
| 2,385,766 | 9/1945 | Thurston | 260—249.9 XR |
| 2,909,420 | 10/1959 | Gysin et al. | 260—249.9 XR |
| 3,097,205 | 7/1963 | Cutler | 260—248 |

FOREIGN PATENTS

| | | |
|---|---|---|
| 579,987 | 6/1959 | Belgium. |
| 867,226 | 5/1961 | Great Britain. |

OTHER REFERENCES

Abstracted in Derwent Belgian, Patents Report, vol. 60B, p. C20 (January–June 1960).

Piskala et al., Coll. Czech. Chem. Commun., vol. 28, pp. 1681–90, July 1963.

WALTER A. MODANCE, *Primary Examiner.*

JOHN D. RANDOLPH, *Examiner.*

J. M. FORD, *Assistant Examiner.*